United States Patent [19]

Burley

[11] 3,995,602
[45] Dec. 7, 1976

[54] HIGH COMBUSTION SURFACE TEMPERATURE ROTOR FOR AN INTERNAL COMBUSTION ROTARY ENGINE

[75] Inventor: Harvey A. Burley, Warren, Mich.

[73] Assignee: General Motors Corporation, Detroit, Mich.

[22] Filed: Aug. 26, 1975

[21] Appl. No.: 608,005

[52] U.S. Cl. .......................... 123/8.45; 123/8.01; 418/178

[51] Int. Cl.² ...................................... F02B 53/04

[58] Field of Search .............. 123/8.01, 8.05, 8.13, 123/8.45; 418/178

[56] References Cited

UNITED STATES PATENTS

| | | | |
|---|---|---|---|
| 3,144,006 | 8/1964 | Meurer | 123/8.13 |
| 3,200,795 | 8/1965 | Meurer | 123/8.13 |
| 3,359,956 | 12/1967 | Bentele | 123/8.01 |
| 3,859,013 | 1/1975 | Stevenson | 123/8.01 X |
| 3,888,606 | 6/1975 | Uy | 123/8.01 X |

Primary Examiner—Clarence R. Gordon
Attorney, Agent, or Firm—Ronald L. Phillips

[57] ABSTRACT

A multi-apex rotor for an internal combustion rotary engine is provided on its radially outwardly facing flanks with hot plates which each form a portion of a combustion chamber and have a shape and coefficient of expansion in relation to the rotor body so that they are normally separated within their periphery from the adjacent flank by a sealed air space so as to be insulated therefrom and thereby retain a substantial portion of the heat of combustion and on hot plate temperature rise with engine speed and load to a level below that which would cause pre-ignition expanding radially inwardly to establish a substantial heat conducting relationship with the flank to thereby limit hot plate temperature to below the pre-ignition temperature.

2 Claims, 4 Drawing Figures

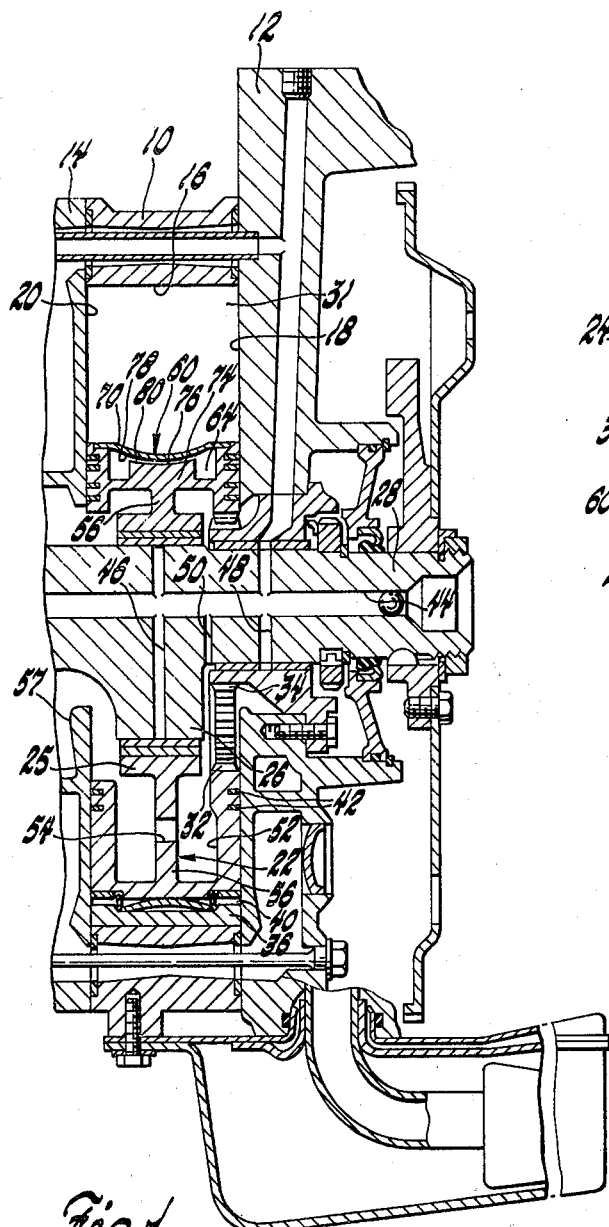

HIGH COMBUSTION SURFACE TEMPERATURE ROTOR FOR AN INTERNAL COMBUSTION ROTARY ENGINE

This invention relates to a high combustion surface temperature rotor for an internal combustion rotary engine and more particularly to such a structure wherein the combustion surface temperature is limited to below the pre-ignition temperature.

In internal combustion engines it is known that raising the combustion chamber wall temperature can be effective in reducing HC emissions by reducing the quenching effect of the wall. In the current production type rotary engine whose chambers have a higher surface-to-volume ratio than a piston engine, there are thus believed to be even greater possible gains in HC reduction by this method. Typically, such rotary engine combustion chambers are formed by a peripheral wall and opposing side walls which are cooled by circulating coolant therepast while the rotor which forms the remainder and a substantial portion of the moving chambers is cooled by circulating therethrough a portion of the oil used in lubrication. Thus, while the engine housings having the peripheral wall and side walls may be readily modified and/or the coolant circulation controlled to raise combustion wall temperature while maintaining the temperature increase at the end of compression below the pre-ignition temperature, the rotor by virtue of its motion and normal oil cooling presents difficulties in raising and controlling its combustion surface temperature to reduce HC emissions while avoiding pre-ignition.

According to the present invention the rotor's combustion surface temperature is increased while pre-ignition is avoided by insulating that surface from the rest of the rotor until a temperature at a selected value below the pre-ignition temperature is reached. In a preferred embodiment this is accomplished by securing hot plates to the rotors radially outwardly facing flanks with these hot plates then forming a portion of the moving combustion chambers. These hot plates are sealingly secured about their periphery to the flank surfaces and are movable radially inwardly in response to increased temperature so as to seat aganst the flank surface in substantially increased heat conduction relationship. The radial movement in relation to the rotor body is such that the hot plate is normally separated within its perimeter by a sealed air space from the adjacent flank surface so as to be insulated therefrom and thereby retain a substantial portion of the heat of combustion. Then on hot plate temperature rise with engine speed and load to a certain temperature below that which would cause pre-ignition the hot plate moves to seat against the adjacent flank surface to thereby limit the hot plate temperature to below the pre-ignition temperature.

An object of the present invention is to provide a new and improved rotor for an internal combustion rotary engine.

Another object is to provide a high combustion surface temperature rotor for an internal combustion rotary engine wherein the surface temperature is controlled to rise with engine speed and load but is limited to below the pre-ignition temperature.

Another object is to provide a high combustion surface temperature rotor for an internal combustion rotary engine wherein a hot plate is secured to the rotor and is normally separated within its perimeter by a sealed air space therefrom so as to retain a substantial portion of the heat of combustion and on hot plate temperature rise with engine speed and load to a predetermined temperature below that which would cause pre-ignition expanding to have substantially increased heat conduction relationship with the rotor body to thereby limit hot plate temperature to below the pre-ignition temperature.

These and other objects and advantages of the present invention will be more apparent from the following description and drawing in which:

FIG. 1 is a partial longitudinal view in section of an internal combustion rotary engine having a preferred embodiment of the rotor according to the present invention.

FIG. 2 is a side view of the rotor with portions thereof broken away.

FIG. 3 is a view taken on the line 3—3 in FIG. 2 showing one of the hot plates in its normal minimum heat conducting relationship with the rotor body.

FIG. 4 is very similar to FIG. 3 but showing the hot plate in its maximum heat conducting relationship with the rotor body.

A preferred embodiment of the rotor according to the present invention is shown in use in FIG. 1 in a tworotor internal combustion rotary engine of which only the rear rotor arrangement is shown. The parts of the engine shown include a rear rotor housing 10 bolted between a rear housing 12 and an intermediate housing 14. The rotor housing 10 has a radially inwardly facing peripheral wall 16 having the shape of a two-lobe epitrochoid or a curve parallel thereto and the housings 12 and 14 have parallel extending face-to-face side walls 18 and 20 which together with the peripheral wall 16 form a space in which a rotor 22 is located. The rotor 22 has the general shape of a triangle with three apexes 24 and is rotatably mounted at its central hub 25 on an eccentric 26 of a crankshaft 28. The crankshaft 28 is rotatably supported in the rear housing 12 and the engine front housing, not shown, the crankshaft axis coinciding with the center line of the peripheral wall and the eccentric's center line being offset therefrom. The rotor has three outwardly facing flanks 30 which cooperate with the stationary peripheral walls and side walls to provide three chambers 31 which are spaced about the rotor and expand and contract in fixed relation to the stationary engine housing twice during each rotor revolution and every three crankshaft revolutions. This phasing is fixed by the rotor having an internal tooth ring gear 32 formed concentric therewith on the outboard side thereof which meshes with a stationary external tooth annular gear 34 which has two-thirds the number of teeth of the ring gear and is fixed to the rear housing 12. Typically, the chambers are sealed by apex seals 36 which are mounted in slots at the rotor apexes and engage the peripheral wall, side seals 38 which are mounted in grooves in the rotor sides and extend adjacent the flanks and engage the adjacent side wall and corner seals 40 which are mounted in holes in the rotor sides at the apexes and provide sealing between adjacent ends of the side seals and apex seals. In addition, there are circular oil seals 42 which are mounted in concentric grooves in the rotor sides and engage the side walls radially inwardly of the gas seals.

In such an arrangement a combustible gaseous mixture is delivered to the chambers during their intake phase by intake ports in the side walls and/or an intake port in the peripheral wall, the mixture in the chambers is ignited after the compression phase by one or more spark plugs and following the expansion or power phase the products of combustion are exhausted through an exhaust port in the peripheral wall and/or exhaust ports in the side walls. The opening and closing of both the intake and exhaust porting is by movement of the rotor relative thereto as is well known. The induction system, intake ports, exhaust ports, spark plugs and the ignition system are not shown since they are well known to those skilled in the art. One such arrangement is disclosed in U.S. Pat. No. 3,907,468 assigned to the assignee of this invention and is hereby incorporated by reference.

In such engine arrangements oil rather than the coolant used in the stationary housings is circulated through the interior of the planetating rotor 22 to effect cooling thereof. This is accomplished as shown in FIG. 1 by an oil network wherein an oil passage 44 through the center of the crankshaft receives oil under pressure. The oil passage 44 distributes this oil to radial passages 46 and 48 to lubricate the rotor and crankshaft bearings respectively and also to a radial passage 50 to lubricate the phasing gears 32 and 34 with the latter oil also being directed into the hollow interior 52 of the rotor. The rotor body is of I-beam construction and has openings 54 in the central rib 56 thereof which permit the oil to pass through. The oil then exits the rotor to an oil return gallery 57 formed in the side wall 20 radially inwardly of the oil seals, the oil thus removing heat from the rotor body through the interior wall 52 as it passes through. For a more detailed description of such oil cooling of the rotor, reference is made to U.S. Pat. No. 3,855,987 assigned to the assignee of this invention which is hereby incorporated by reference.

It is known that engines of this type have higher HC emissions than engines of the reciprocating piston type and this has been attributed at least in part to the higher surface-to-volume ratio of the rotary engine's combustion chambers. By raising the combustion wall temperature, its quenching effect is reduced and HC emissions are lowered; however, the wall temperature cannot be permitted to rise to the point where it would cause pre-ignition. In a preferred embodiment of the present invention to the rotor combustion chamber flank surface temperature is increased by insulating that surface from the rotor body only below the pre-ignition temperature by means of hot plates 60 having a pre-determined heat conduction relationship with the rotor body. As shown in FIGS. 2 and 3 the rotor 22 has a modified body 62 preferably of cast iron wherein a peripherally extending elongated recess 64 is formed in each of its flanks 30 and extends substantially the length thereof terminating adjacent the rotor apexes. The hot plates 60 are preferably of stamped steel and by suitable means such as welding are permanently fixed and hermetically sealed about their periphery to a relieved flank edge 66 about the respective recesses 64. The radially outwardly facing surface 70 of the hot plate thus forms almost all the rotor's share of the combustion chamber wall and is provided with a concave shape or pocket to provide the desired compression ratio. The thus sealed recess 64 provides an air space or chamber which acts as an insulator to reduce the heat flow from the combustion surface 70 to the inner oil cooled wall 52 of the rotor body 62. As a result the temperature of the surface 70 is substantially raised as compared with a flank surface formed directly on the rotor body 62 and this acts to reduce the quench layer on this surface and thereby reduce HC emissions.

Control of hot plate temperature is provided by a heat conducting rib 74 formed in each recess 64 integral with the rotor body 62. Each of the ribs 74 extends the length of the recess as shown in FIG. 2 and is centered cross-wise and extends radially outward from the bottom thereof as shown in FIG. 3. The heat conducting ribs 74 have a concave radially outwardly facing surface 76 which conforms to the radially inwardly facing surface 78 of the hot plates 60 and the plates are movable radially inwardly in response to increased temperature so that their inner surface 78 seats on the rib surface 76 in heat conduction relationship.

The radially inward movement of the hot plates 60 is determined in relation to the rib 74 of the rotor body so that the plate's inner surface 78 is normally separated from the adjacent heat conduction rib surface 76 by a substantial clearance 80 so as to be insulated by the sealed air space 64 during most engine operation. But then on hot plate temperature rise with engine speed and load to a predetermined temperature which can be just below or close to that which would cause pre-ignition the radially inward thermal expansion of the plate 60 causes the internal surface 78 to seat on the heat conducting rib surface 76 as shown in FIG. 4 whereby the hot plate is then no longer effectively insulated by the air space 64. With this large, centered heat conduction path established substantial heat now flows from the hot plate 60 through the heat conducting rib 74 of the rotor body to the interior rotor body wall 52 where it is carried away by the oil being circulated through the rotor. With the heat thus carried away or dissipated, the hot plate surface 70 is effectively prevented from rising to the pre-ignition temperature.

The above described embodiment is illustrative of the invention which may be modified within the scope of the appended claims.

I claim:

1. A rotor for an internal combustion rotary engine, said rotor having a body with axially spaced radially extending sides and radially outwardly facing flanks, and hot plate means sealingly secured to the flanks and spanning at least substantial portions thereof to form substantial portions of moving combustion chambers, said hot plate means being movable radially inwardly in response to increased temperature so as to seat against said rotor body in increased heat conducting relationship, the radial movement in relation to said rotor body being such that said hot plate means are normally separated by sealed air spaces from said rotor body so as to be insulated therefrom and thereby retain a substantial portion of the heat of combustion and on hot plate temperature rise with engine speed and load to a temperature below that which would cause pre-ignition moving to seat against the rotor body to thereby limit hot plate temperature to below the pre-ignition temperature.

2. A rotor for an internal combustion rotary engine said rotor having an internally cooled body with axially spaced radially extending sides and radially outwardly facing flanks, said flanks having elongated recesses each with a heat conducting rib extending out from the bottom thereof and hot plate means sealingly secured to the flanks about said recesses and spanning at least substantial portions thereof to form portions of moving combustion chambers, said hot plate means being movable radially inwardly in response to increased temperature so as to seat against said heat conducting ribs of said rotor body in heat conducting relationship, the radial movement in relation to said rotor body being such that said hot plate means are normally separated from said heat conducting ribs by sealed air spaces from said rotor body formed by said recesses so as to be insulated therefrom and thereby retain a substantial portion of the heat of combustion and on hot plate temperature rise with engine speed and load to a temperature below that which would cause pre-ignition moving to seat against said heat conducting ribs of said rotor body to thereby limit hot plate temperature to below the pre-ignition temperature.

* * * * *